(12) United States Patent
Usami

(10) Patent No.: US 11,843,747 B2
(45) Date of Patent: Dec. 12, 2023

(54) INFORMATION PROCESSING APPARATUS FOR INTERPROCESS COMMUNICATION TO PERFORM PROCESSING WITHOUT REQUIRING COMPLETION OF PREPARATION FOR RECEIVING A MESSAGE

(71) Applicant: CANON KABUSHIKI KAISHA, Tokyo (JP)

(72) Inventor: Kenta Usami, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/831,291

(22) Filed: Jun. 2, 2022

(65) Prior Publication Data
US 2022/0394151 A1    Dec. 8, 2022

(30) Foreign Application Priority Data

Jun. 8, 2021  (JP) ................................ 2021-096105

(51) Int. Cl.
*H04N 1/32* (2006.01)
*H04N 1/00* (2006.01)
*H04N 1/327* (2006.01)

(52) U.S. Cl.
CPC ....... *H04N 1/32683* (2013.01); *H04N 1/0097* (2013.01); *H04N 1/00344* (2013.01); *H04N 1/32614* (2013.01); *H04N 1/32662* (2013.01); *H04N 1/32765* (2013.01)

(58) Field of Classification Search
CPC ................................ H04N 1/32683
USPC ....................................... 358/1.15
See application file for complete search history.

(56) References Cited

U.S. PATENT DOCUMENTS

| | | | | |
|---|---|---|---|---|
| 2011/0075198 | A1* | 3/2011 | Agehama | G06F 3/1203 358/1.15 |
| 2018/0048780 | A1* | 2/2018 | Hikichi | H04N 1/00885 |
| 2018/0052643 | A1* | 2/2018 | Fujisawa | G06F 3/1206 |
| 2019/0068825 | A1* | 2/2019 | Ikeda | H04N 1/32593 |

FOREIGN PATENT DOCUMENTS

| | | |
|---|---|---|
| JP | H10333928 A | 12/1998 |
| JP | 2001197083 A | 7/2001 |
| JP | 2002215420 A | 8/2002 |
| JP | 2004126125 A | 4/2004 |

* cited by examiner

*Primary Examiner* — Jacky X Zheng
(74) *Attorney, Agent, or Firm* — Canon U.S.A., Inc. IP Division

(57) ABSTRACT

An information processing apparatus includes a first device, a second device, and one or more controllers that function as a first processing unit capable of controlling the first device, and a second processing unit capable of controlling the second device. The first processing unit receives information from the first device about a status of the first device and transmits a message to the second processing unit. The second processing unit receives the message from the first processing unit and controls the second device. In startup processes, the first and second processing units perform processes to start a communication with each other such that the first processing unit stores predetermined information in a predetermined storage area based on the information about the status of the first device received from the first device, and the second processing unit controls the second device based on the predetermined information acquired from the storage area.

10 Claims, 5 Drawing Sheets

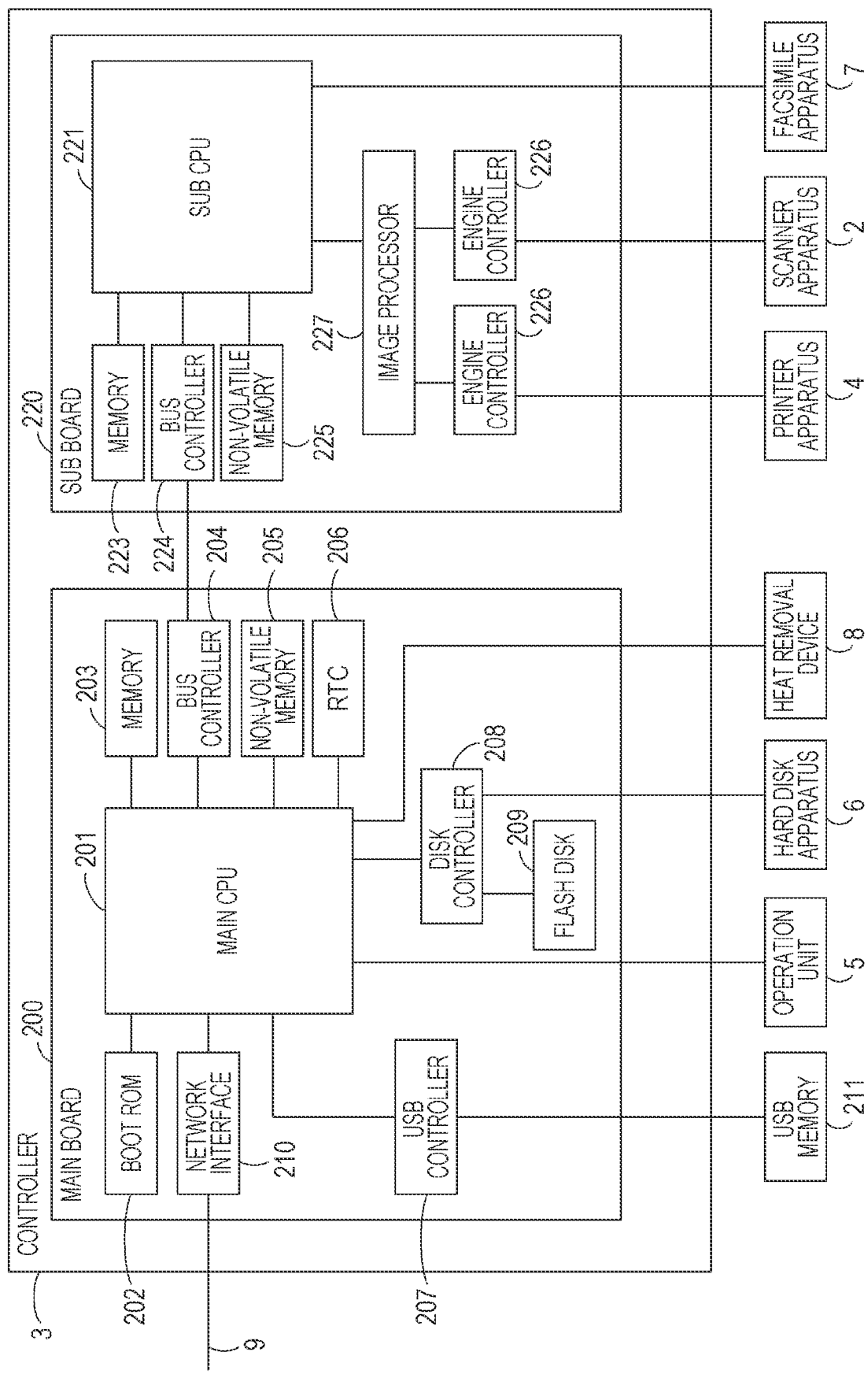

INFORMATION PROCESSING APPARATUS FOR INTERPROCESS COMMUNICATION TO PERFORM PROCESSING WITHOUT REQUIRING COMPLETION OF PREPARATION FOR RECEIVING A MESSAGE

BACKGROUND OF THE DISCLOSURE

Field of the Disclosure

The present disclosure relates to an information processing apparatus, a method for controlling the information processing apparatus, and a program.

Description of the Related Art

Conventionally, it is known to perform internode communication using a communication path for current use and a spare communication path provided in a path network. The communication path for the current use and the spare communication path are used such that the same signals are transmitted between two nodes via different paths using the same communication method. When the communication path for the current use fails, the spare communication path can be used.

Japanese Patent Laid-Open No. 2001-197083 discloses a technique in which one or more communication paths for current use and one or more spare communication paths are provided, and in a case where an increase in a bandwidth occurs in a path network, some spare communication paths are temporarily diverted for use as current paths thereby increasing the capacity of the currently used paths.

Also in a case where an abnormality occurs in interprocess communication, it may be possible to change the communication path used currently to some spare communication path to continue the communication according to the conventional technique. However, in the interprocess communication, when it is tried to perform communication using a spare communication path according to the same communication method as that used in the communication using the current communication path, the normal interprocess communication is not guaranteed. For example, even when a transmission-side process is ready for communication, if a reception-side process is not ready for reception, interprocess communication cannot be performed correctly even if a spare path is used.

One idea to solve the above issue may be to perform an interprocess communication without using a spare transmission path such that synchronize is achieved between the transmission-side process and the reception-side process, and after the reception-side process becomes ready for receiving, the transmission-side process transmits information to the reception-side process. However, in a system that requires real-time control, the synchronization processing between the transmission-side process and the reception-side process may affect the entire system, which may make it difficult to employ this method in such a system. In the system that requires real-time control, when the system is started, it is not easy to achieve synchronization between the transmission-side process and the reception-side process, and thus there is a possibility that the transmission-side process completes the preparation for transmission before the reception-side process completes the preparation for reception. Even in such a situation, there is a need to achieve correct interprocess communication. In other words, there is a need to have an interprocess communication method in which even when the transmission-side process transmits a message to the reception-side process before the reception-side process completes the preparation for receiving, the reception-side process does not miss the message.

SUMMARY OF THE DISCLOSURE

In view of the above, the present disclosure provides an interprocess communication method in which when the transmission-side process transmits a message to the reception-side process, the reception-side process can correctly perform processing without missing the message regardless of whether the reception-side process has completed the preparation for receiving.

In an aspect, the present disclosure provides an information processing apparatus including a first device, a second device, and one or more controllers configured to function as a first processing unit capable of controlling the first device, wherein the first processing unit receives information from the first device about a status of the first device and transmits a message to the second processing unit, and a second processing unit capable of controlling the second device, wherein the second processing unit receives the message from the first processing unit and controls the second device, wherein, the first processing unit performs, in a process of a series of startup processes, a process for starting a communication with the second processing unit, and the second processing unit performs, in a process of a series of startup processes, a process for starting a communication with the first processing unit, and wherein, the first processing unit stores predetermined information in a predetermined storage area based on the information about the status of the first device received from the first device in the series of startup processes, and the second processing unit controls the second device based on the predetermined information acquired from the storage area in the series of startup processes.

Further features of the present disclosure will become apparent from the following description of exemplary embodiments with reference to the attached drawings.

BRIEF DESCRIPTION OF THE DRAWINGS

FIG. 2 is a block diagram showing an example of a configuration of a controller of an image forming device according to an embodiment.

DESCRIPTION OF THE EMBODIMENTS

Embodiments of the present disclosure are described below with reference to drawings.

It should be noted that the following embodiments do not limit the present disclosure defined in the claims. It also should be noted that all combinations of features described in the embodiments are not necessarily needed to practice the present disclosure.

In the embodiments described below, an image forming device is taken as an example of an information processing apparatus according to the present disclosure.

System Configuration

Figure 1:
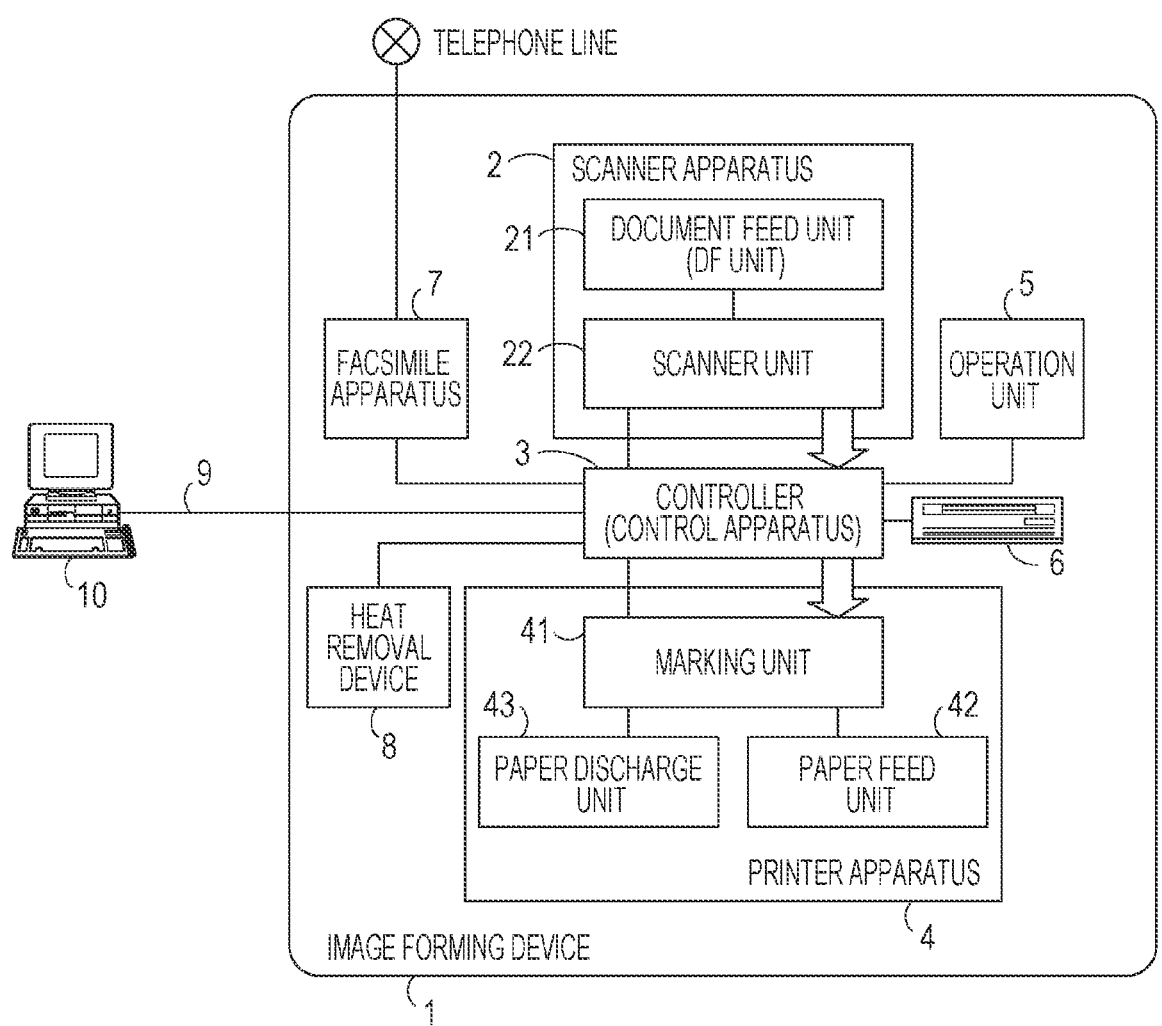
FIG. 1 is a block diagram showing an example of a system configuration of an image forming device according to an embodiment.

FIG. 1 is a block diagram showing an example of a system configuration of an image forming device, which is an embodiment of the information processing apparatus according to the present disclosure.

The image forming device 1 includes modules including a scanner apparatus 2, a printer apparatus 4, an operation unit 5, a hard disk apparatus 6, a facsimile apparatus 7, a heat removal device 8, and a controller 3.

The scanner apparatus 2 optically reads an image from a document and converts it into a digital image.

The printer apparatus 4 outputs the digital image to a recording medium such as paper.

The operation unit 5 is a unit for operating the image forming device 1 and displaying information for a user.

The hard disk apparatus (hereinafter referred to as the HDD apparatus) 6 stores digital images, control programs, etc.

The facsimile apparatus 7 transmits and receives a digital image via a telephone line or the like.

The heat removal device 8 is provided to cool heat in the image forming device 1 and maintain the temperature at an appropriate level.

The controller 3 is connected to each of the modules described above and is capable of executing a job on the image forming device 1 by issuing an instruction to each module. The controller 3 can be connected to a LAN 9. The image forming device 1 can be connected to a computer 10 via the LAN 9, thereby making it possible to input/output a digital image, issue a job, instruct a device, etc.

The scanner apparatus 2 includes a document feed unit 21 and a scanner unit 22. The document feed unit 21 is capable of automatically feeding documents sequentially from a stack of documents. The scanner unit 22 is capable of optically scanning a document and converting it into a digital image. The image data converted into the digital image by the scanner unit 22 is transmitted to the controller 3.

The printer apparatus 4 includes a paper feed unit 42 capable of sequentially feeding paper from a stack of paper one by one, a marking unit 41 for printing image data on the fed paper, and a paper discharge unit 43 for discharging the printed paper.

The heat removal device 8 is a fan provided to cool the heat in the image forming device 1. In the present embodiment, the heat removal device 8 is a power supply fan that cools the power supply unit. In addition, other heat removal devices such as a controller fan for cooling the controller unit, an HDD fan for cooling the HDD apparatus 6, and/or the like may be provided.

The computer 10 executes a job by transmitting an instruction to the controller 3 via the LAN 9. For example, when the computer 10 transmit an OFF instruction to the controller 3, the controller 3 controls an OFF process of the image forming device 1.

The image forming device 1 can execute various jobs and can achieve various functions. Some examples thereof are described below.

Copy function: An image read from the scanner apparatus 2 is stored in the HDD apparatus 6 and is, at the same time, printed using the printer apparatus 4.

Image transmission function: An image read from the scanner apparatus 2 is transmitted to the computer 10 or other apparatuses via the LAN 9.

Image storage function: An image read from the scanner apparatus 2 is stored in the HDD apparatus 6, and the image is transmitted or printed as needed.

Image printing function: Information described in page description language transmitted from the computer 10 or the like is analyzed and printed using the printer apparatus 4.

FIG. 2 is a block diagram showing an example of a configuration of the controller 3.

The controller 3 includes a main board 200 and a sub board 220.

The main board 200 is a so-called general-purpose CPU system. The main board 200 includes a main CPU 201, a boot ROM 202, a memory 203, a bus controller 204, a non-volatile memory 205, an RTC 206, a USB controller 207, a disk controller 208, a flash disk 209, and a NIC 210.

The main CPU 201 controls the entire main board 200. The boot ROM 202 stores a boot program. The memory 203 is used, as a work memory, by the CPU 201. The bus controller 204 has a bridge function with an external bus. The non-volatile memory 205 is a storage apparatus for storing various types of information. The non-volatile memory 205 is capable of holding information when power is turned off. The RTC 206 has a clock function.

The USB controller 207 is capable of controlling a USB device (for example, the USB memory 211) connected to the USB controller 207. The disk controller 208 controls a storage apparatus (for example, the HDD apparatus 6, the flash disks 209, etc.). The flash disk 209 is a relatively small-capacity non-volatile storage apparatus composed of semiconductor devices, such as an SSD (Solid State Drive). The NIC 210 is a network interface controller and for controlling the connection with the LAN 9.

The USB memory 211, the operation unit 5, the HDD apparatus 6, the heat removal device 8, etc., which are located outside, are connected to the main board 200.

The sub board 220 includes a relatively small general-purpose sub CPU system, image processing hardware, etc. The sub board 220 includes a sub CPU 221, a memory 223, a bus controller 224, a non-volatile memory 225, an image processor 227, an engine controller 226, and the like.

The sub CPU 221 controls the entire sub board 220. The memory 223 is used as a work memory by the sub CPU. The bus controller 224 has a bridge function with an external bus. The non-volatile memory 225 is a memory in which data is held without being deleted even when power is turned off. The image processor 227 performs real-time digital image processing. The engine controller 226 controls an external apparatus. The external scanner apparatus 2 and the external printer apparatus 4 transmits/receives digital image data via the engine controller 226.

The sub CPU 221 directly controls the facsimile apparatus 7.

Note that FIG. 2 is a simplified block diagram. For example, the main CPU 201, the sub CPU 221 and the like include many pieces of CPU peripheral hardware such as a chipset, a bus bridge, a clock generator, and the like, but they are not shown for simplicity. Note that the description of the block diagram shown in FIG. 2 does not limit the present disclosure.

The operation of the controller 3 is described below taking an image copying operation as an example.

When a user instructs, via the operation unit 5, to copy an image of a document, the main CPU 201 transmits an image read command to the scanner apparatus 2 via the sub CPU 221.

The scanner apparatus 2 optically scans a paper document, converts it into digital image data, and inputs the digital image data to the image processor 227 via the engine controller 226. The image processor performs a DMA transfer to the memory 223 via the sub CPU 221 and temporarily stores the digital image data therein.

When it is confirmed that a certain amount of or all of the digital image data is stored in the memory 223, the main CPU 201 issues an image output instruction to the printer apparatus 4 via the sub CPU 221. The sub CPU 221 informs the image processor 227 of a location in the memory 223 where the image data is stored. The image processor 227 transmits the image data from the memory 223 to the printer apparatus 4 via the engine controller 226 according to a synchronization signal from the printer apparatus 4. The printer apparatus 4 prints digital image data on paper or the like.

In a case where a plurality of copies are printed, the main CPU 201 may save image data acquired from the memory 223 in the HDD apparatus 6. When the second and following copies are printed, the image data saved in HDD apparatus 6 may be transmitted to the printer apparatus 4 without further acquiring the image data from the scanner apparatus 2.

Control using interprocess communication in the image forming device 1 is described below taking, as an example, control of the heat removal device 8.

Figure 3A:
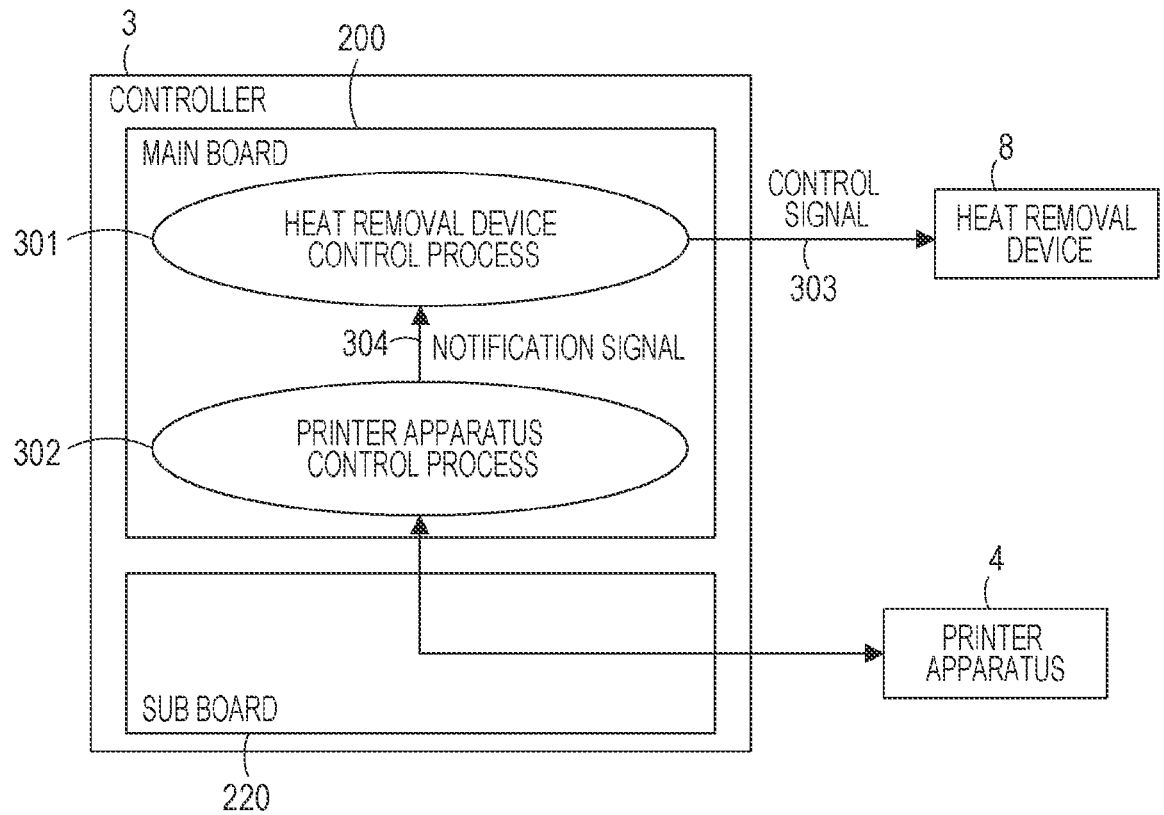
FIGS. 3A and 3B are diagrams showing an example of an outline of a conventional interprocess communication and an example of a sequence of each process performed when an image forming device is started.

FIG. 3A is a diagram illustrating an example of an outline of conventional interprocess communication (interprocess communication in the control of a heat removal device in this example). The control of the heat removal device 8 using the conventional interprocess communication is performed as follows.

A heat removal device control process 301 monitors the status of the controller 3. The heat removal device control process 301 controls the heat removal device 8 to rotate or stop by using a control signal 303 depending on the status of the controller 3 such as starting of the image forming device 1, the standby status, executing of a job, an occurrence of an error due to the controller 3, or the like.

A printer apparatus control process 302 acquires the status of the printer apparatus 4 by communicating with the printer apparatus 4 via the sub board 220. When the printer apparatus control process 302 acquires a change in the status of the printer apparatus 4 such as executing of printing, an occurrence of a jam, an occurrence of an error caused by the printer apparatus 4, or the like, the printer apparatus control process 302 notifies the heat removal device control process 301 of the occurrence of the change in the status using a notification signal 304. Based on the received notification signal 304, the heat removal device control process 301 controls the heat removal device 8. Note that the printer apparatus control process 302 performs communications with the printer apparatus 4 to perform various controls, in addition to the control described above, although a further detailed description thereof is omitted.

Next, a sequence of each of the above-described processes at startup of the image forming device 1 is described.

Figure 3B:
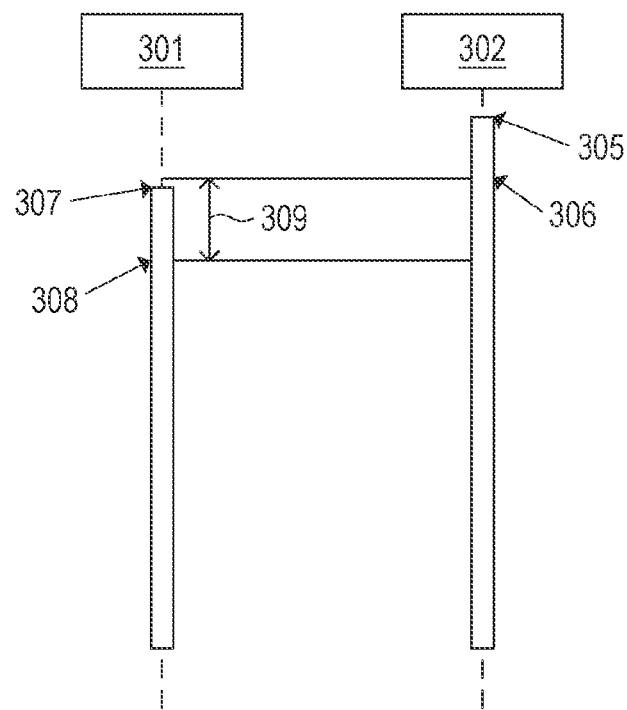

FIG. 3B is a diagram showing an example of a sequence of each of the above processes performed when the image forming device 1 is started.

To make it possible for a user to start using the image forming device 1 as quickly as possible after the startup of the image forming device 1, the printer apparatus control process 302 starts its process (305) before the heat removal device control process 301 starts its process.

After the process starts (305), the printer apparatus control process 302 performs an initialization process and prepares for interprocess communication with the heat removal device control process 301. When the preparation for the interprocess communication is completed (306), the printer apparatus control process 302 becomes possible of transmitting the notification signal 304.

Next, a sequence of the heat removal device control process 301 is described.

The heat removal device control process 301 operates asynchronously with the printer apparatus control process 302. The heat removal device control process 301 starts (307) after or before the preparation by the printer apparatus control process 302 for the interprocess communication is completed (306).

After the process starts (307), the heat removal device control process 301 performs an initialization process and prepares for interprocess communication with the printer apparatus control process 302. When the preparation for the interprocess communication is completed (308), the heat removal device control process 301 becomes possible of receiving the notification signal 304.

In a period from the time when the preparation by the printer apparatus control process 302 for the interprocess communication is completed (306) to the time when the preparation by the heat removal device control process 301 for the interprocess communication is completed (308), the heat removal device control process 301 is not ready for the interprocess communication, and thus interprocess communication is not allowed in this period (309). Therefore, when the printer apparatus control process 302 transmits the notification signal 304 to the heat removal device control process 301 to notify, if an error caused by the printer apparatus 4 or the like occurs in the period 309, the notification signal does not reach the heat removal device control process 301 (the notification signal is not received by the heat removal device control process 301). This may make it impossible to correctly control the heat removal device 8.

Figure 4:
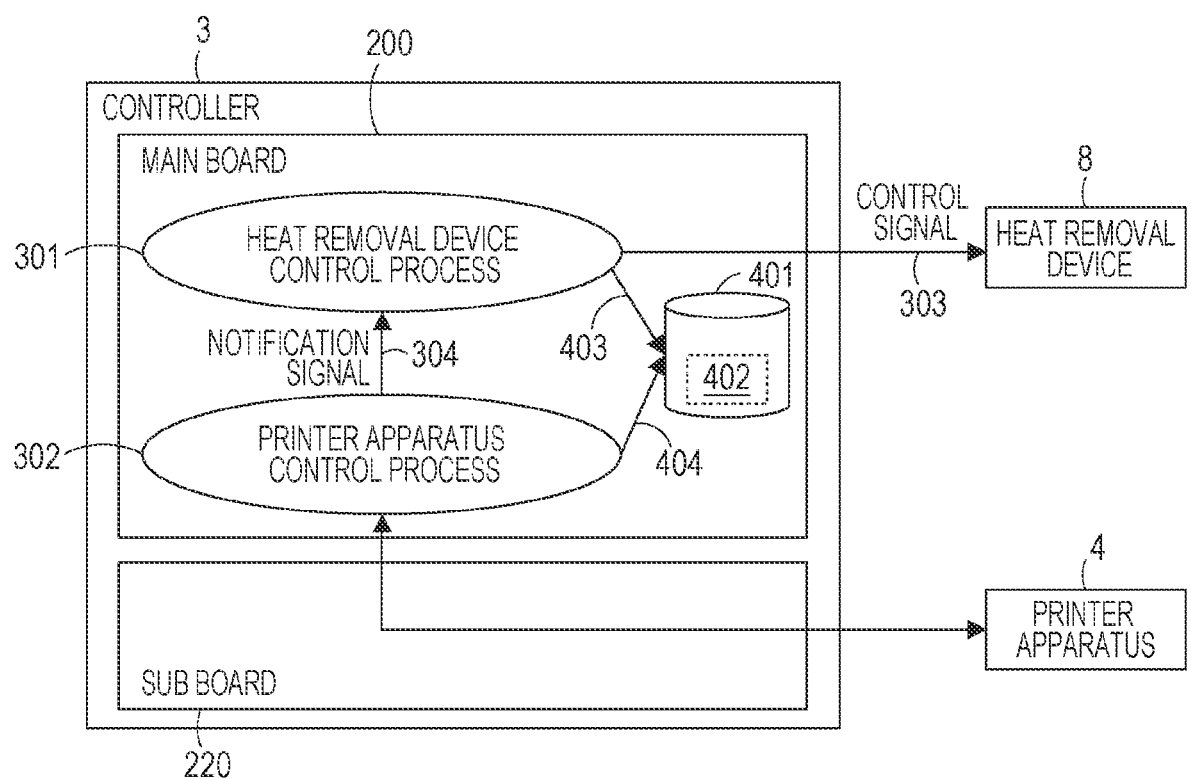
FIG. 4 is a diagram showing an example of an outline of an interprocess communication according to an embodiment.

FIG. 4 is a diagram illustrating an example of an outline of interprocess communication (interprocess communication in the control of the heat removal device in this example) according to the present embodiment.

In the present embodiment, the image forming device 1 has a temporary folder 401 provided in the main board 200 such that the temporary folder 401 is accessible by both the heat removal device control process 301 and the printer apparatus control process 302. Files in the temporary folder 401 are all deleted when the power of the image forming device 1 is again turned on. In the present embodiment, the temporary folder 401 is provided in a predetermined storage area (for example, a RAM disk) in the memory 203, but this is merely an example.

When the printer apparatus control process 302 transmits the notification signal 304 to the heat removal device control process 301, the printer apparatus control process 302 accesses the temporary folder 401 (404) and generates a file 402 with a name determined in advance between the printer apparatus control process 302 and the heat removal device control process 301.

The heat removal device control process 301 accesses the temporary folder 401 (403) only once after the initialization process is completed and immediately before the preparation for the interprocess communication is completed (308), and confirms whether the file 402 generated by the printer apparatus control process 302 exists. When the file 402 exists, the heat removal device control process 301 regards that the notification signal 304 has been sent from the printer apparatus control process 302 to the heat removal device control process 301 in the period 309 in which the interprocess communication is not allowed. In this case, the heat removal device control process 301 controls the heat removal device 8 assuming that the notification signal 304 has been received. On the other hand, in a case where the file 402 does not exist, the heat removal device control process 301 regards that there was no notification signal 304 from the printer apparatus control process 302 to the heat removal device control process 301 in the period 309 in which the interprocess communication is not allowed, and the heat removal device control process 301 waits for the completion of the preparation for the interprocess communication (308). After the preparation for interprocess communication is completed (308), a normal interprocess communication is performed between the printer apparatus control process 302 and the heat removal device control process 301.

The printer apparatus control process 302 is generalized as a "transmission-side process", and the heat removal device control process 301 is generalized as a "reception-side process", and a generalized interprocess communication according to the present embodiment is described below. Referring to FIG. 5, a description is given below as to a method that allows it to perform processing correctly without missing a message in the reception-side process even in a case where the transmission-side process transmits the message when the reception-side process is not ready for the interprocess communication.

Figure 5B:
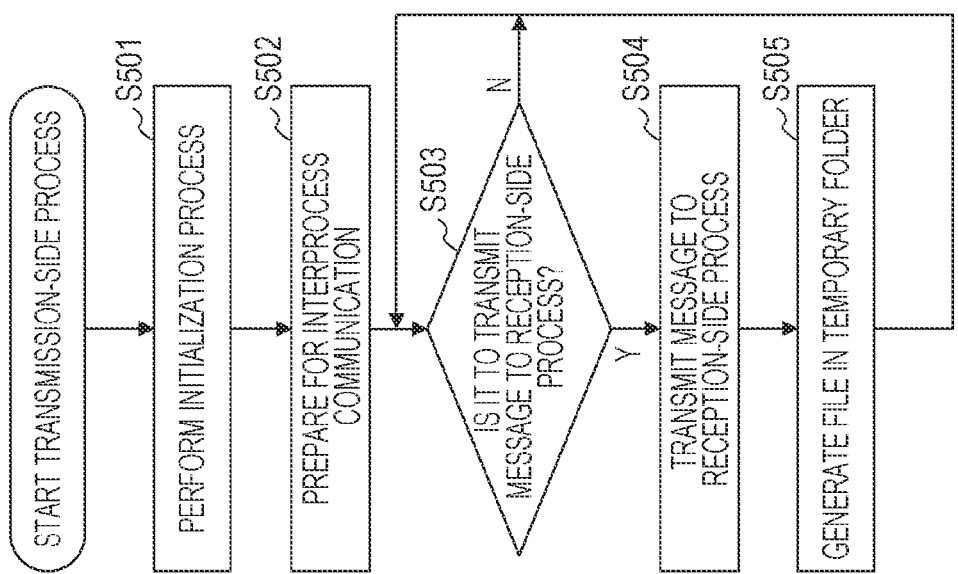
FIGS. 5A and 5B are flowcharts showing an example of an interprocess communication according to an embodiment.
Figure 5A:
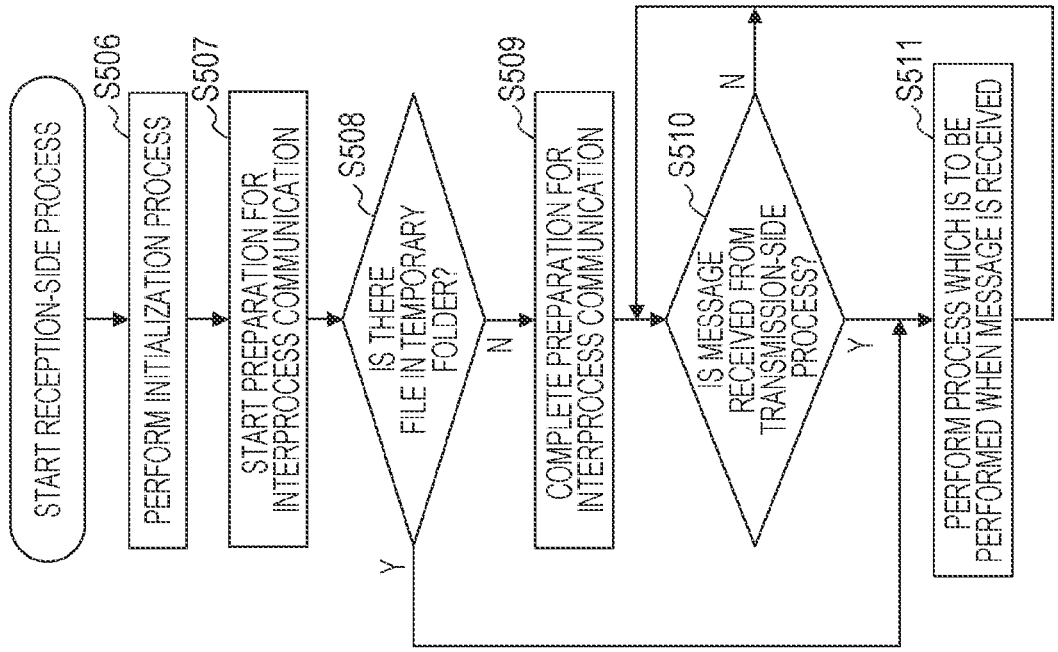

FIGS. 5A and 5B are flowcharts showing an example of an interprocess communication according to the present embodiment. A transmission-side process and a reception-side process shown in FIGS. 5A and 5B are executed, in the example shown in FIG. 2, by the main CPU 201 by executing a program stored in a storage apparatus such as the boot ROM 202, the non-volatile memory 205, the flash disk 209, the HDD apparatus 6, or the like.

When the CPU 201 starts the transmission-side process, the transmission-side process performs an initialization process including initial setting of various hardware (HW) components, initializing variables, starting a main task, and the like other than the preparation for the interprocess communication (S501), and prepares for the interprocess communication (S502). When the preparation for interprocess communication is completed, it becomes possible for the transmission-side process to transmit a message to the reception-side process, and the process proceeds to S503.

In S503, the transmission-side process determines whether it is necessary to transmit a message to the reception-side process. In a case where it is necessary to transmit the message (Yes in S503), the transmission-side process transmits the message to the reception-side process (S504). Thereafter, the transmission-side process generates a file in a temporary folder (S505) and returns to S503. The message transmitted in S504 corresponds to the "notification signal 304" in the example shown in FIG. 4. The order of performing S504 and S505 may be reversed.

In a case where it is not necessary to transmit a message in S503 (No in S503), the transmission-side process again makes the determination in S503.

When the CPU 201 starts the reception-side process, the reception-side process performs an initialization process including initial setting of various HW components, initializing variables, starting a main task, and the like other than the preparation for the interprocess communication (S506), and starts preparing for the interprocess communication (S507).

Immediately before the preparation for the interprocess communication is completed, the reception-side process determines whether the file 402 exists in the temporary folder 401 (S507). In a case where the file 402 exists in the temporary folder 401 (Yes in S507), the reception-side process regards that a message has been received before the completion of the preparation for the interprocess communication, and performs a process under the assumption that the message has been received (S511). The process S511 corresponds to the transmission of the control signal 303 or the like in the example shown in FIG. 4, and more specifically, corresponds to a process of calling a callback function or the like.

In a case where the file 402 does not exist in the temporary folder 401 (No in S507), the reception-side process proceeds to S510 when the reception-side process becomes ready for the interprocess communication (S509).

In S510, the reception-side process determines whether a message has been received from the transmission-side process. The message, subjected to the determination in S510 as to whether it has been received, corresponds to the "notification signal 304" in the example shown in FIG. 4.

In a case where no message is received (No in S510), the reception-side process waits, in S510, to receive the message.

In a case where a message is received (Yes in S510), the reception-side process performs a process which is to be performed when the message is received (S511). After the process S511, the reception-side process returns to S510 and again waits for a message from the transmission-side process.

In the above description, the printer apparatus control process 302 transmits a notification to the heat removal device control process 301 by generating the file 402 in the temporary folder 401 provided in the predetermined area in the memory 203. Note that the temporary folder 401 may be provided in other storage areas (in the non-volatile memory 205, the flash disk 209, the HDD apparatus 6, or the like). Note that if the temporary folder 401 is provided in the non-volatile storage area, all files in the temporary folder 401 are deleted after the power is again turned on or when the determination is made in S508 in FIG. 5 as to whether the file 402 exists. The configuration for storing the file 402 in the temporary folder 401 may be arbitrarily changed as long as predetermined information is stored in a predetermined storage area accessible by both the transmission-side process and the reception-side process. For example, a bit may be set/reset at a predetermined address or in a predetermined register or the like in a memory accessible by both processes.

In the above description, immediately before the completion of the preparation for the interprocess communication is completed after the initialization process is completed, the reception-side process accesses the temporary folder 401 to confirm whether the file 402 exists. Alternatively, for example, immediately after the completion of the preparation for the interprocess communication, the reception-side process may access the temporary folder 401 to confirm whether the file 402 exists. That is, the confirmation as to whether the predetermined information is stored in the predetermined storage area may be performed at a timing related to the completion of the preparation for the interprocess communication.

In the present embodiment, as described above, the temporary folder (directory) is provided which can be accessed by both the transmission-side process and the reception-side process, and files stored in which are deleted when the power of the system is turned off. Each time the transmission-side process transmits a notification message to the reception-side process, the transmission-side process generates a file in the temporary directory. The reception-side process confirms only once whether a file has been generated in the temporary folder by the transmission-side process, for example, immediately before the preparation of the reception-side process for the interprocess communication after the initialization process is completed.

In a case where the file has been generated, it is regarded that a notification message has been transmitted before the completion of the reception preparation, and a process including calling a registered callback function is performed in the same way as when a message is received normally. That is, in the interprocess communication, in a case where an abnormality occurs in a communication path used in the normal interprocess communication or in a case where one of the processes is not ready for the communication, a method (the file 402 in the above example) different from the normal interprocess communication method (the notification signal 304 in the above example) is used. This makes it possible for the reception-side process to receive and process a notification from the transmission-side process without missing the notification even when an abnormality occurs in communication according to the normal interprocess communication method.

In the present embodiment, the transmission-side process and the reception-side process are not synchronized, and thus the method according to the present embodiment can be adopted even in a system that requires real-time control. In a system where it is not easy to synchronize the transmission-side process and the reception-side process, even when a notification message is transmitted from the transmission-side process to the reception-side process before the preparation for the reception is completed in the reception-side process, the reception-side process does not miss the message. Therefore, regardless of whether the reception-side process has completed the preparation for receiving, even when the transmission-side process transmits a notification message to the reception-side process without synchronization, the reception-side process can correctly perform processing without missing the message.

Note that the present disclosure is not limited to the image forming device, and can be applied to various information processing apparatuses using interprocess communication. The present disclosure can be applied to various devices (electronic devices) having a built-in computer, for example, home appliances, automobiles, and other various devices. For example, in an electronic device having a plurality of modules in which a transmission-side process monitors the state of one of the modules, when a predetermined state change in the module is detected, the transmission-side process transmits a message (the notification signal 304 in the example described above) to the reception-side process. The reception-side process is a process that controls one of the other modules. When the reception-side process receives the message from the transmission-side process, the reception-side process executes a predetermined process to perform predetermined control on the one of the other modules. A predetermined storage area is provided which is accessible by both the transmission-side process and the reception-side process. When the transmission-side process transmits the message to the reception-side process, predetermined information is stored in the storage area. In a case where the predetermined information has been stored in the storage area at a timing related to the completion of the preparation for the interprocess communication with the transmission-side process performed at the start of the reception-side process, it is regarded that the message from the transmission-side process has been received, and the process is executed.

Thus, when the transmission-side process transmits a notification message to the reception-side process, the reception-side process does not miss the notification message and can correctly perform control regardless of whether the reception-side process has completed the preparation for receiving.

It should be noted that the structures and contents of the various data are not limited to those described above, and the structures and contents of the various data may be modified depending on the use and purpose thereof.

The present disclosure has been described above with reference to embodiments. Note that the present disclosure may be implemented in other various forms such as a system, an apparatus, a method, a program, a storage medium, or the like. More specifically, the present disclosure may be applied to a system including a plurality of devices, or to an apparatus including a single device.

Also note that any configuration obtained as a result of arbitrarily combining the above embodiments also falls within the scope of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-096105 filed Jun. 8, 2021, which is hereby incorporated by reference herein in its entirety.

What is claimed is:

1. An information processing apparatus comprising:
a first device;
a second device; and
one or more controllers configured to function as:
a first processing unit capable of controlling the first device, wherein the first processing unit receives information from the first device about a status of the first device and transmits a message to a second processing unit; and
the second processing unit capable of controlling the second device, wherein the second processing unit receives the message from the first processing unit and controls the second device,
wherein, the first processing unit performs, in a process of a series of startup processes, a process for starting a communication with the second processing unit, and the second processing unit performs, in a process of a series of startup processes, a process for starting a communication with the first processing unit,
wherein, the first processing unit stores predetermined information in a predetermined storage area based on the information about the status of the first device received from the first device in the series of startup processes, and the second processing unit controls the second device based on the predetermined information acquired from the storage area in the series of startup processes,
wherein the process for starting the communication with the second processing unit and the process for starting the communication with the first processing unit is not synchronized such that control of the second device is dependent on the message or the predetermined information acquired from the storage area in the series of startup processes.

2. The information processing apparatus according to claim 1, wherein the first processing unit and the second processing unit are started when the information processing apparatus is started.

3. The information processing apparatus according to claim 1, wherein the information stored in the storage area is deleted when the information processing apparatus is restarted.

4. The information processing apparatus according to claim 1, wherein the information stored in the storage area is deleted when the information processing apparatus is shut down.

5. The information processing apparatus according to claim 1, wherein the predetermined storage area is a folder provided in a memory disposed in the information processing apparatus, and the predetermined information is a file generated in the folder.

6. The information processing apparatus according to claim 1, wherein the first device is an image forming device.

7. The information processing apparatus according to claim 1, wherein the second device is a heat removal device.

8. The information processing apparatus according to claim 1, wherein the first processing unit acquires information related to a predetermined status change from the image forming device.

9. A method of controlling an information processing apparatus including a first device and a second device, the control method comprising:
a first processing for controlling the first device, wherein the first processing receives information from the first device about a status of the first device and transmits a message to a second processing; and
the second processing for controlling the second device, wherein the second processing receives the message from the first processing and controls the second device,
wherein, the first processing performs, in a process of a series of startup processes, a process for starting a communication with the second processing, and the second processing performs, in a process of a series of startup processes, a process for starting a communication with the first processing, and
wherein, the first processing stores predetermined information in a predetermined storage area based on the information about the status of the first device received from the first device in the series of startup processes, and the second processing controls the second device based on the predetermined information acquired from the storage area in the series of startup processes,
wherein the process for starting the communication with the second processing and the process for starting the communication with the first processing is not synchronized such that control of the second device is dependent on the message or the predetermined information acquired from the storage area in the series of startup processes.

10. A non-transitory storage medium storing a program for causing a controller to execute a control method of controlling an information processing apparatus including a first device and a second device, the control method comprising:
first processing for controlling the first device, wherein the first processing receives information from the first device about a status of the first device and transmits a message to a second processing; and
the second processing for controlling the second device, wherein the second processing receives the message from the first processing and controls the second device,
wherein, the first processing performs, in a process of a series of startup processes, a process for starting a communication with the second processing, and the second processing performs, in a process of a series of startup processes, a process for starting a communication with the first processing, and
wherein, the first processing stores predetermined information in a predetermined storage area based on the information about the status of the first device received from the first device in the series of startup processes, and the second processing controls the second device based on the predetermined information acquired from the storage area in the series of startup processes,
wherein the process for starting the communication with the second processing and the process for starting the communication with the first processing is not synchronized such that control of the second device is dependent on the message or the predetermined information acquired from the storage area in the series of startup processes.

* * * * *